United States Patent
Ohashi

(10) Patent No.: US 8,672,359 B2
(45) Date of Patent: Mar. 18, 2014

(54) TANK SUPPORT ARRANGEMENTS FOR A VEHICLE

(75) Inventor: Yasuhiko Ohashi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/376,077

(22) PCT Filed: Jun. 5, 2009

(86) PCT No.: PCT/JP2009/060374
§ 371 (c)(1),
(2), (4) Date: Dec. 2, 2011

(87) PCT Pub. No.: WO2010/140256
PCT Pub. Date: Dec. 9, 2010

(65) Prior Publication Data
US 2012/0080250 A1 Apr. 5, 2012

(51) Int. Cl.
*B60L 11/18* (2006.01)
(52) U.S. Cl.
USPC .......................................... 280/834; 180/69.4
(58) Field of Classification Search
CPC ........................................................ B60K 1/04
USPC .............. 180/65.31, 69.4; 280/830, 831, 832, 280/833, 834; 296/187.03, 187.05, 187.08, 296/187.11
See application file for complete search history.

(56) References Cited

U.S. PATENT DOCUMENTS

| | | | | |
|---|---|---|---|---|
| 6,086,103 A * | 7/2000 | Fukagawa et al. | ............ | 280/830 |
| 6,557,596 B2 * | 5/2003 | Ono et al. | ................. | 141/311 A |
| 6,672,620 B2 * | 1/2004 | Kawazu et al. | ............... | 280/834 |
| 6,692,028 B2 * | 2/2004 | Koster | ........................... | 280/830 |
| 6,824,168 B2 * | 11/2004 | Kawazu et al. | ............... | 280/834 |
| 6,953,099 B2 * | 10/2005 | Kawasaki et al. | ............ | 180/65.1 |
| 6,983,945 B2 * | 1/2006 | Kawasaki et al. | ............ | 280/834 |
| 7,040,432 B2 * | 5/2006 | Kawasaki et al. | ............ | 180/65.1 |
| 7,063,355 B2 * | 6/2006 | Hashimura | ................... | 280/830 |
| 7,137,474 B2 * | 11/2006 | Yokote | ......................... | 180/314 |
| 7,198,301 B2 * | 4/2007 | Wozniak et al. | .............. | 280/830 |
| 7,264,277 B2 * | 9/2007 | Ono et al. | ..................... | 280/830 |

(Continued)

FOREIGN PATENT DOCUMENTS

| | | |
|---|---|---|
| JP | 10-278601 A | 10/1998 |
| JP | 2000-219049 A | 8/2000 |

(Continued)

OTHER PUBLICATIONS

International Search Report mailed Aug. 25, 2009 of PCT/JP2009/060374.

*Primary Examiner* — Katy M Ebner
*Assistant Examiner* — Brodie Follman
(74) *Attorney, Agent, or Firm* — Kenyon & Kenyon LLP

(57) ABSTRACT

An object is to provide a vehicle in which the configuration of a frame supporting a tank is effectively used. In order to achieve such an object, the vehicle includes a tank supported by a pair of side frames and cross frames which traverse the side frames, wherein a displacement suppression target on a vehicle floor is supported by the cross frames, the displacement suppression target having a relative displacement during an action of an external force on the vehicle, needed to be suppressed. The tank is preferably suspended on the cross frames. In addition, the displacement suppression target is preferably attached to the cross frames on which the tank is suspended.

6 Claims, 8 Drawing Sheets

(56) References Cited

U.S. PATENT DOCUMENTS

| | | | |
|---|---|---|---|
| 7,363,997 B2* | 4/2008 | Sato et al. | 180/65.31 |
| 7,481,411 B2* | 1/2009 | Jang | 248/610 |
| 7,703,564 B2* | 4/2010 | Kondo | 180/65.31 |
| 7,819,431 B2* | 10/2010 | Minami | 280/834 |
| 7,926,601 B2* | 4/2011 | Ono et al. | 180/68.5 |
| 8,051,934 B2* | 11/2011 | Kiya et al. | 180/68.5 |
| 8,083,263 B2* | 12/2011 | Yamanami et al. | 280/830 |
| 8,366,152 B2* | 2/2013 | Tsubokawa | 280/834 |
| 2002/0121772 A1* | 9/2002 | Koster | 280/830 |
| 2003/0189334 A1* | 10/2003 | Kawasaki et al. | 280/834 |
| 2004/0101745 A1* | 5/2004 | Kawasaki et al. | 429/96 |
| 2004/0149500 A1* | 8/2004 | Chernoff et al. | 180/65.1 |
| 2004/0239095 A1* | 12/2004 | Wozniak et al. | 280/834 |
| 2005/0161935 A1* | 7/2005 | Ono et al. | 280/834 |
| 2005/0258630 A1* | 11/2005 | Choi | 280/834 |
| 2006/0061080 A1* | 3/2006 | Luttinen et al. | 280/784 |
| 2006/0113128 A1* | 6/2006 | Sato et al. | 180/65.1 |
| 2006/0197300 A1* | 9/2006 | Nakashima et al. | 280/124.109 |
| 2006/0197332 A1* | 9/2006 | Hashimura | 280/834 |
| 2006/0289224 A1* | 12/2006 | Ono et al. | 180/311 |
| 2007/0000702 A1* | 1/2007 | Yoshida et al. | 180/65.3 |
| 2007/0119646 A1* | 5/2007 | Minami | 180/271 |
| 2008/0023957 A1* | 1/2008 | Diehl | 280/834 |
| 2008/0111048 A1* | 5/2008 | Jang | 248/562 |
| 2009/0001767 A1* | 1/2009 | Yamaguchi et al. | 296/203.04 |
| 2009/0309349 A1* | 12/2009 | Yamanami et al. | 280/830 |
| 2010/0045018 A1* | 2/2010 | Kondo et al. | 280/834 |
| 2010/0252353 A1* | 10/2010 | Tsubokawa | 180/314 |
| 2012/0080251 A1* | 4/2012 | Ohashi | 180/65.31 |
| 2012/0161430 A1* | 6/2012 | Mulanon | 280/834 |

FOREIGN PATENT DOCUMENTS

| | | |
|---|---|---|
| JP | 2004-161055 A | 6/2004 |
| JP | 2005-132348 A | 5/2005 |
| JP | 2009190523 A | 8/2009 |

* cited by examiner

TANK SUPPORT ARRANGEMENTS FOR A VEHICLE

This is a 371 national phase application of PCT/JP2009/060374 filed 5 Jun. 2009, the contents of which are incorporated herein by reference.

FIELD OF THE INVENTION

The present invention relates to a vehicle. More specifically, the present invention relates to the improvements of the structure of the vehicle on which a tank is mounted.

BACKGROUND OF THE INVENTION

One of the problems for a vehicle which mounts a tank, such as a fuel cell vehicle on which a high-pressure hydrogen tank is mounted, is how to mount a tank having the largest capacity possible while securing an interior space and a space for housing other components. As such a vehicle, there is proposed a vehicle in which a large tank and small tank are mounted in that order from the vehicle front side such that these tanks are sandwiched by a pair of rear frames near a rear seat (see, e.g., Patent Document 1).

PRIOR ARTS

Patent Document(s)

Patent Document 1: JP 2004-161055 A

SUMMARY OF THE INVENTION

Problem to be Solved by the Invention

However, the configuration of frames supporting a tank is not sufficiently and effectively used in existing vehicles on which tanks are mounted.

Hence, an object of the present invention is to provide a vehicle which makes effective use of the configuration of a frame supporting a tank.

Means for Solving the Problem

To solve such a problem, the present inventor has performed various types of investigation. For example, when mounting a high-pressure hydrogen tank on a fuel cell vehicle, it is effective to mount a tank under the floor of the vehicle posterior to maximize the capacity of such tank while securing an interior space, etc. In such case, it is more effective to mount such tank under a rear seat or between right and left rear wheels in a horizontal state. To ensure durability performance and impact resistance performance (for example, a performance for protecting a passenger from an external force when being rear-ended from behind) in such tank mounted structure, there are proposed a structure in which a tank is integrated with a rear suspension member and a structure in which a tank itself is mounted on a strong frame. However, the structure in which the tank is integrated with the rear suspension member or the structure in which the tank is mounted on the frame are structures which need some sort of additional members to the original vehicle structure, and are likely to result in a weight increase. In addition, it is also likely to fall in a vicious cycle where a body needs to be reinforced due to such weight increase, resulting in a further weight increase. The inventor has performed investigations on the effective use of the configuration of a frame supporting a tank to suppress the weight increase, and has consequently found a technology capable of solving the above problem.

The present invention, which has been developed based on such a finding, is a vehicle comprising a tank supported by a pair of side frames and cross frames which traverse such side frames, wherein a displacement suppression target on a vehicle floor is supported by the cross frames, the displacement suppression target having a relative displacement during an action of an external force on the vehicle, needed to be suppressed.

Such vehicle has a structure in which a tank and a displacement suppression target (for example, a rear seat) are integrally supported by a cross frame. Typically, a tank, which is a heavy component, has a large inertial force (inertial mass), and therefore has a relatively small relative displacement during a collision of such vehicle. The present invention provides a structure in which a displacement suppression target is supported integrally with a tank, and reduces the relative displacement of such displacement suppression target, allowing an external force which may act on a passenger under such circumstances to be reduced. In addition, the present invention has a configuration in which such displacement suppression target is supported together with a tank by a cross frame, and therefore a weight increase can be suppressed since it does not need to be reinforced by other frame structures or the like.

In this vehicle, the tank is preferably suspended on the cross frames. Furthermore, in such case, the displacement suppression target is preferably attached to the cross frames on which the tank is suspended.

Additionally, in this vehicle, a plurality of the tanks are preferably disposed and arranged in the direction of vehicle travel. In such case, a front tank disposed on the side of the direction of vehicle travel preferably has a weight relatively heavier compared to those of other tanks. In the present invention, a rear seat of the vehicle is integrated with the front tank. In such case, the displacement suppression target other than the rear seat is preferably integrated with at least any of the tanks other than the front tank. Further in such case, a distance between the rear seat and the displacement suppression target other than the rear seat is preferably greater than a distance between the front tank and a tank with which the displacement suppression target is integrated.

Moreover, in the vehicle according to the present invention, the tank is installed transversely so that the tank fits between the pair of side frames.

The vehicle according to the present invention is a fuel cell vehicle on which a fuel cell system is mounted, and the vehicle preferably has a hydrogen tank mounted thereon as the tank. In such case, a constitute component of the fuel cell vehicle is preferably disposed at a position off the central axis of the tank.

Advantageous Effects of the Invention

According to the present invention, a vehicle in which the configuration of a frame supporting a tank is effectively used can be provided.

MODE FOR CARRYING OUT THE INVENTION

Figure 1:
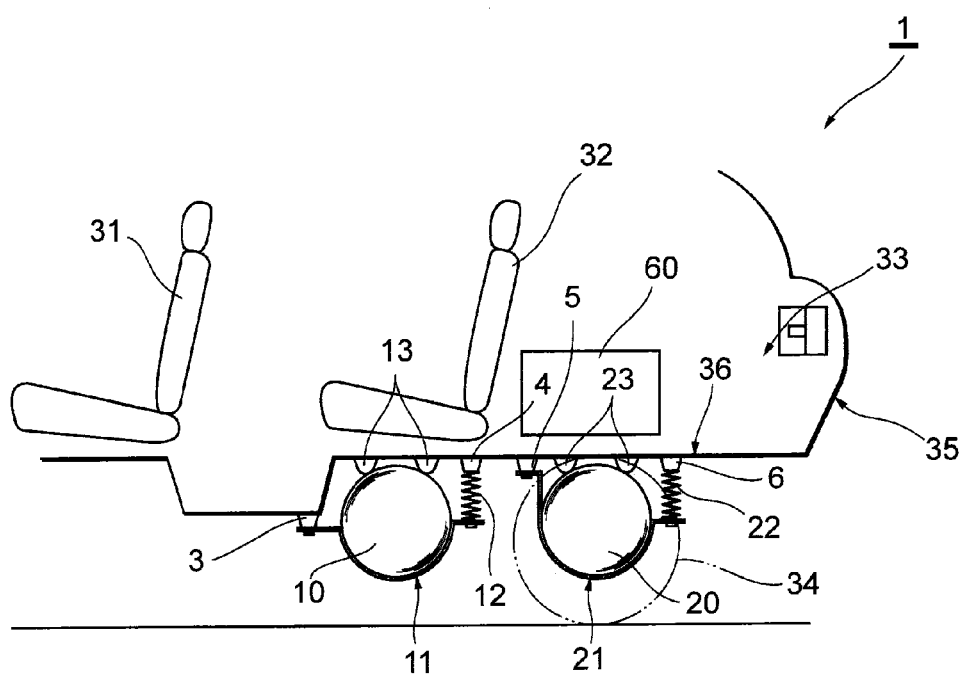
FIG. 1 is a diagram, from the left side view, showing the schematic configuration of an area near the rear section of a fuel cell vehicle in one embodiment of the present invention.

Hereinafter, the configuration of the present invention will be described in detail based on one example of the embodiment shown in the drawings.

As one mode of a vehicle according to the present invention, a fuel cell vehicle (a fuel cell hybrid vehicle (FCHV: Fuel Cell Hybrid Vehicle)) 1 is shown in FIGS. 1-13. A fuel cell system to be mounted on the fuel cell vehicle 1 can be used as, for example, a vehicle-mounted power generation system for the fuel cell vehicle 1, but is not limited to such usage, and is also applicable to a power generation system to be mounted on, for example, various types of transportation such as trains, ships, airplanes, etc. and various mobile objects including a mobile object, such as a robot, that drives itself. It should be noted that, the present invention is not dependent on the number of tanks to be mounted, and is applicable to any cases where one, two or even more tanks are mounted on one vehicle. Hereinafter, the present invention will be described with reference to a case where two hydrogen tanks are mounted, however, such case is merely an example, and the number of tanks will not be limited to two.

A fuel cell (not shown) which constitutes the fuel cell system is constituted of a polymer electrolyte fuel cell or the like having a stack structure in which a plurality of unitary cells are stacked, and the fuel cell uses a supplied reactant gas (fuel gas and oxidizing gas) to generate an electric power. The fuel cell is configured such that the fuel gas such as a hydrogen gas is supplied to a fuel pole (anode) from hydrogen tanks 10, 20 which is a fuel gas supply source, and the oxidizing gas such as air is supplied to an oxygen pole (cathode).

The fuel gas supply source is constituted of, for example, a hydrogen tank, a valve, a regulator, etc., and the amount of fuel gas supplied to the fuel cell is regulated by controlling a valve aperture, ON/OFF time, etc. The fuel cell vehicle 1 of the present embodiment uses, as such fuel gas supply source, two hydrogen tanks (a front tank 10 and a rear tank 20) disposed in the front-rear direction of such vehicle (see FIG. 1, etc.). When a single hydrogen tank is used, the tank becomes larger to ensure a predetermined capacity for storing hydrogen, and tends to be heavy in weight because of a thick FRP layer. In such case, there is no alternative but to sacrifice an interior space to mount such tank on a vehicle. However, when a plurality of hydrogen tanks are used as in the case of the present invention, the upsizing and weight increase of each tank can be suppressed appropriately. Additionally, such case has the advantage that the kinds of positions for disposing the tanks can be increased.

The hydrogen tank (front tank 10, rear tank 20) has a cylindrically-shaped tank body having substantially hemispherical ends and a mouthpiece (shown with reference symbols 10a, 20a in FIG. 8) attached to one end of the tank body in a longitudinal direction. In the present specification, a dome-shaped substantially hemispherical part is called a shoulder part, and is shown with a reference symbol 10d (20d) (see FIG. 7, etc.). The tank body has a structure, such as a double layer structure, formed of, for example, a FRP layer. Furthermore, the sizes of the front tank 10 and rear tank 20 may be different from one another. For example, the present embodiment adopts a front tank 10 having a size and weight larger and heavier than those of a rear tank 20.

A secondary battery 60 is a secondary battery capable of being charged/discharged, and is constituted by a Ni hydrogen battery, Li ion battery or the like, for example. This secondary battery is connected in parallel to the fuel cell across a DC/DC converter (not shown). The DC/DC converter is provided with the features of: stepping up or down a DC voltage input from the second battery 60 to output the DC voltage to the fuel cell side; and stepping up or down a DC voltage input from the fuel cell side to output the DC voltage to the second battery 60.

In addition, the fuel cell vehicle 1 comprises a pair of side frames (side members) 2 and a cross frame (cross member) which traverses such side frames 2. For example, the fuel cell vehicle 1 of the present embodiment comprises, near a rear seat 32, cross frames, namely, the first cross frame (cross member) 3, the second frame 4, the third cross frame 5 and a rear cross frame 6 (see FIGS. 1 and 2). A substantially rectangular gap is formed between these cross frames 3-6. Note that, the reference symbols 31, 33, 34, 35, and 36 indicate a front seat, a luggage space (rear luggage) in the rear section of a vehicle, a rear wheel, a rear bumper, and the floor of a vehicle, respectively.

In the fuel cell vehicle 1, in order to mount a hydrogen tank having as large capacity as possible to increase a cruising distance while ensuring an interior space, it is typical to dispose a tank under the rear seat 32, between the rear wheels, or underneath the rear luggage 33. Further, there is an existing structure in which a hydrogen tank is mounted on a strong rectangular frame, a rear suspension member, etc. However, in the present embodiment, the front tank 10 and rear tank 20 are supported by being directly mounted on a floor in a state of being suspended through the intermediary of tank belts 11, 21 and springs 12, 22, in a lower part of the rear section of the fuel cell vehicle 1 (see FIG. 1). By supporting each of the tanks 10, 20 through the intermediary of springs 12, 22 in such manner, vibration-insulating and vibration-damping effects can be exerted, in particular, when a vehicle is moving.

This supporting structure will be described more specifically. The front tank 10 is disposed between the first cross frame 3 and the second cross frame 4, and the rear tank 20 is disposed between the third cross frame 5 and the rear cross frame 6 (see FIG. 2). Further, a plurality (for example, two) of tank bands 11, 21 are disposed symmetrically, to thereby support the front tank 10 by a front tank band 11 and the rear tank 20 by a rear tank band 21. The front end of the front tank band 11 is directly attached to the first cross frame 3. On the other hand, the rear end of the front tank band 11 is attached to the lower end of the spring 12 provided on the second cross frame 4 (see FIG. 1). The bottom surface of the body in between the first cross frame 3 and the second cross frame 4 is provided thereon an abutment member 13 which is in contact with the periphery of the front tank 10 and is formed of a material such as a rubber, for example. The front tank 10 supported by the front tank band 11 is supported with less backlash by abutting its periphery against the abutment members 13 provided in the front-rear direction and in the left-right direction. Note that, a structure for supporting the rear tank 20 is the same as the above-described supporting structure for the front tank 10 (see FIG. 1, etc.) and includes abutment member 23.

Figure 2:
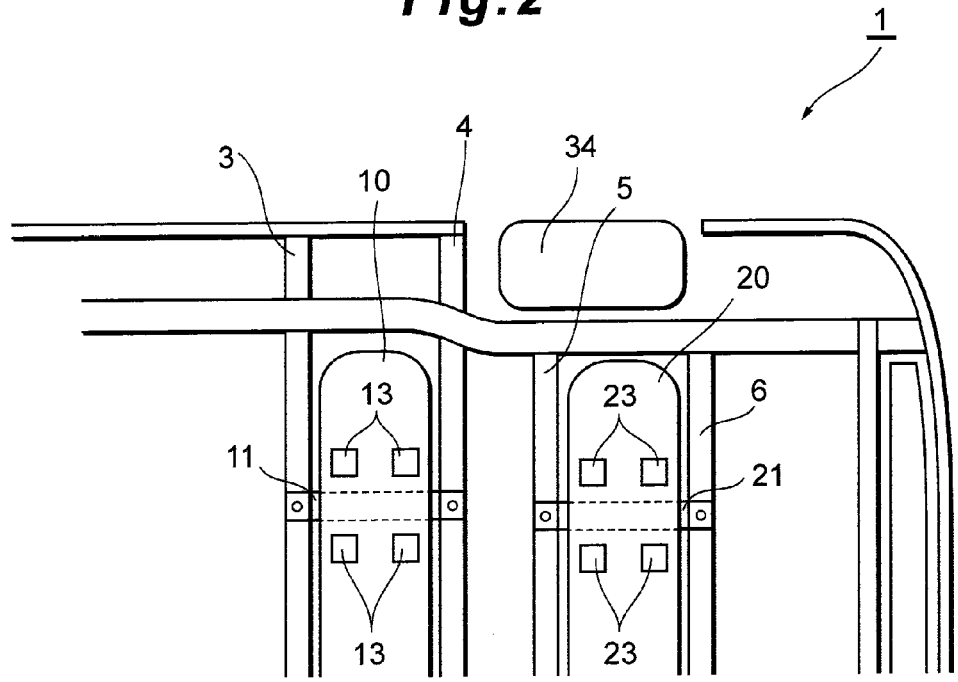
FIG. 2 is a plain view of the fuel cell vehicle shown in FIG. 1.

By taking into account the measures for securing an interior space and for a rear-end collision (the vehicle being collided from behind), the front tank 10 is mounted under the rear seat 32 and the rear tank 20 is mounted between the left and right rear wheels 34 in the present embodiment (see FIGS. 1 and 2). Furthermore, from the viewpoint of the measures for a rear-end collision, it is preferable that the front tank 10 and rear tank 20 are spaced a certain distance or more from the rear bumper 35.

Figure 3:
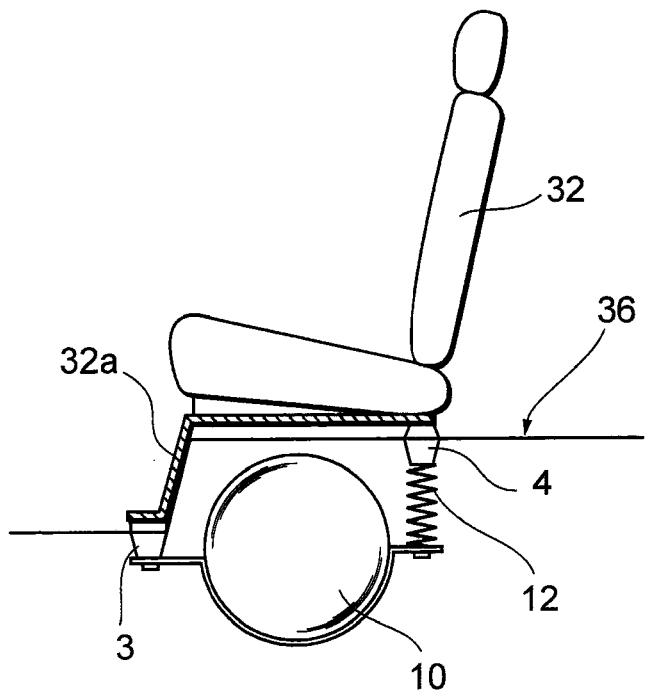
FIG. 3 is a diagram showing one mode of a front tank supported by a cross frame and a rear frame.

In the above-described fuel cell vehicle 1, it is also preferable to fix the frame 32a of the rear seat 32 to the front and rear cross frames (the first cross frame 3, the second cross frame 4) to which the tank band 11 for the front tank 10 is directly or indirectly attached (see FIG. 3). By configuring in such manner, the front tank 10 and the rear seat 32 will show an integral relative movement during a collision. The movement during a collision will be described later. Because a hydrogen tank, which is a heavy component, has a large inertial force (inertial mass), it has a relatively small relative displacement in the front direction and tries to keep remaining at the originally attached position, even if the vehicle body begins to deform, during a rear-end collision of such vehicle. Consequently, the rear seat 32 also has a small relative displacement during a rear-end collision, and an external force acting on a passenger under such situation can easily be reduced. A typical example of rear-end collision is a case where such vehicle is collided from behind by a following vehicle, however, FIGS. 4 and 5 show the vehicle being collided from behind by a test cart (shown with the reference symbol 70) in order to simplify the description.

Figure 5A:
FIGS. 5A to 5D are diagrams showing the appearances of displacement and deformation of a tank, etc. when the vehicle is rear-ended in the time sequence from FIG. 5A to FIG. 5D.
Figure 5B:
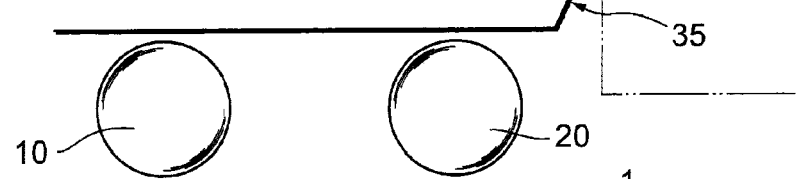
Figure 5C:
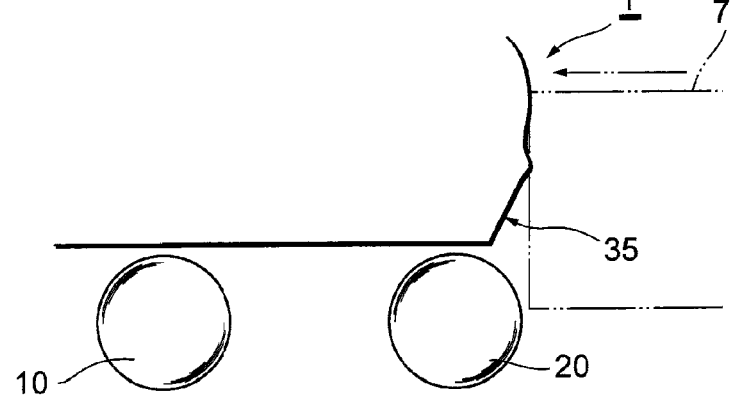
Figure 5D:
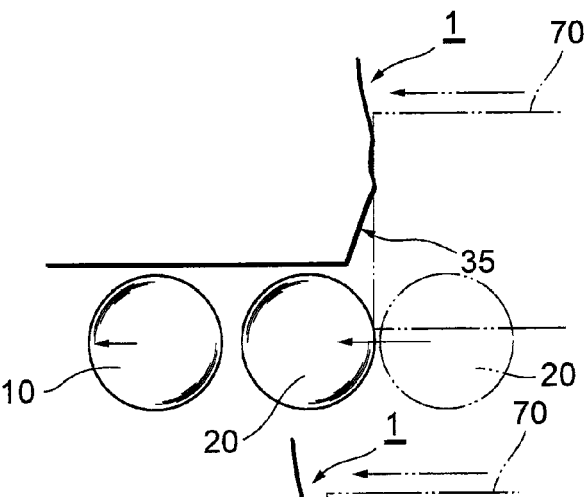
Figure 5D:
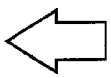
Figure 5D:
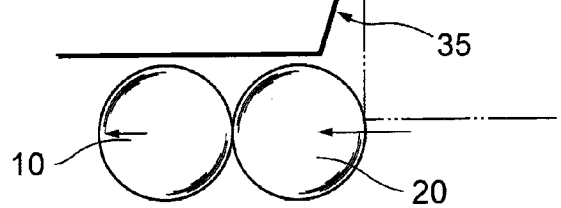
Figure 6:
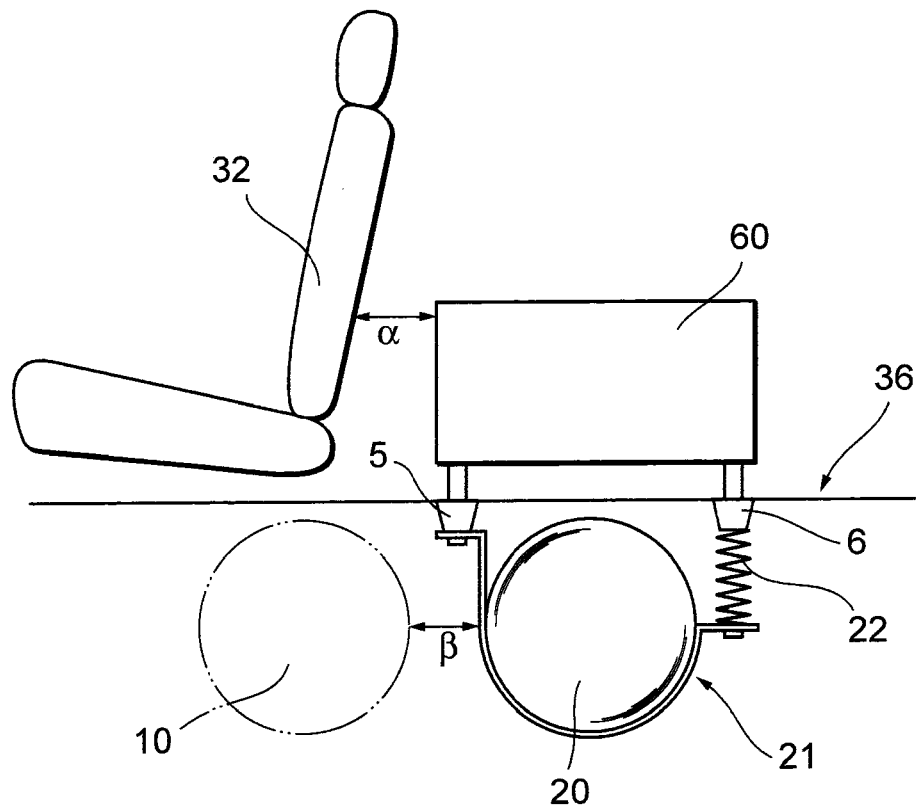
FIG. 6 is a diagram illustrating a distance α between the rear seat and a secondary battery and a distance β between a front tank and a rear tank.
Figure 7:
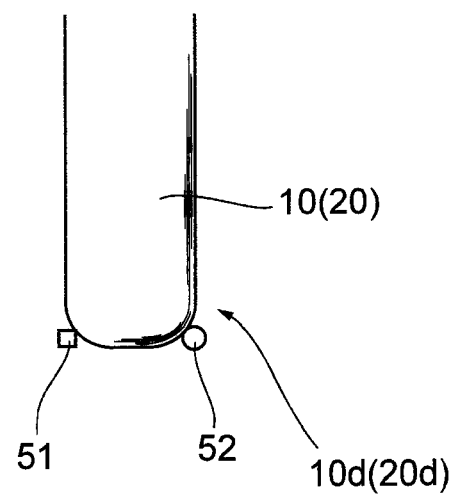
FIG. 7 is a diagram showing an example of the shape of a tank body, and a sensor and regulator disposed in the vicinity of the hemispherically-shaped part (shoulder part) of the tank.
Figure 8:
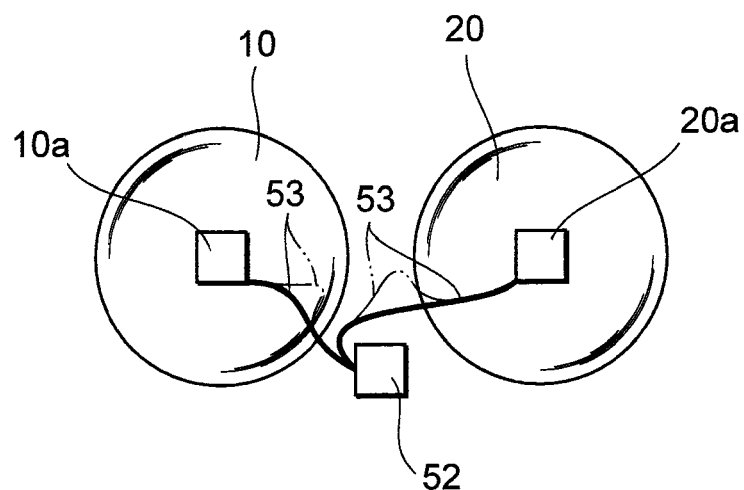
FIG. 8 is a diagram viewed from a longitudinal direction of a tank showing the tank and a regulator disposed near the hemispherically-shaped part (shoulder part) of the tank.
Figure 9:
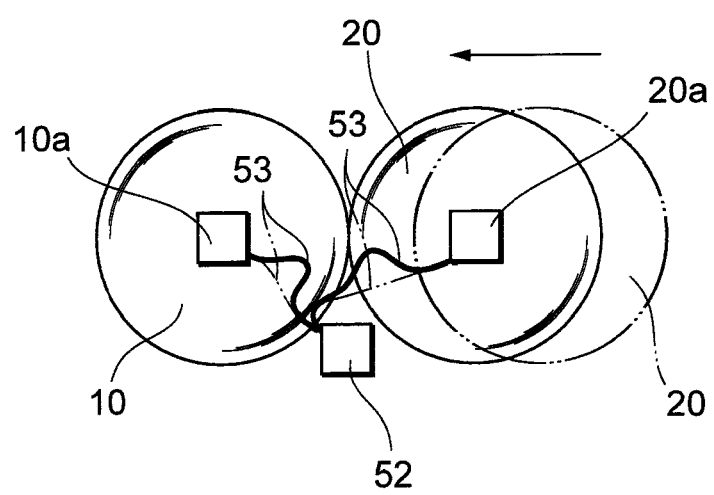
FIG. 9 is a diagram showing the relative displacement of the tank shown in FIG. 8 during a rear-end collision.
Figure 10:
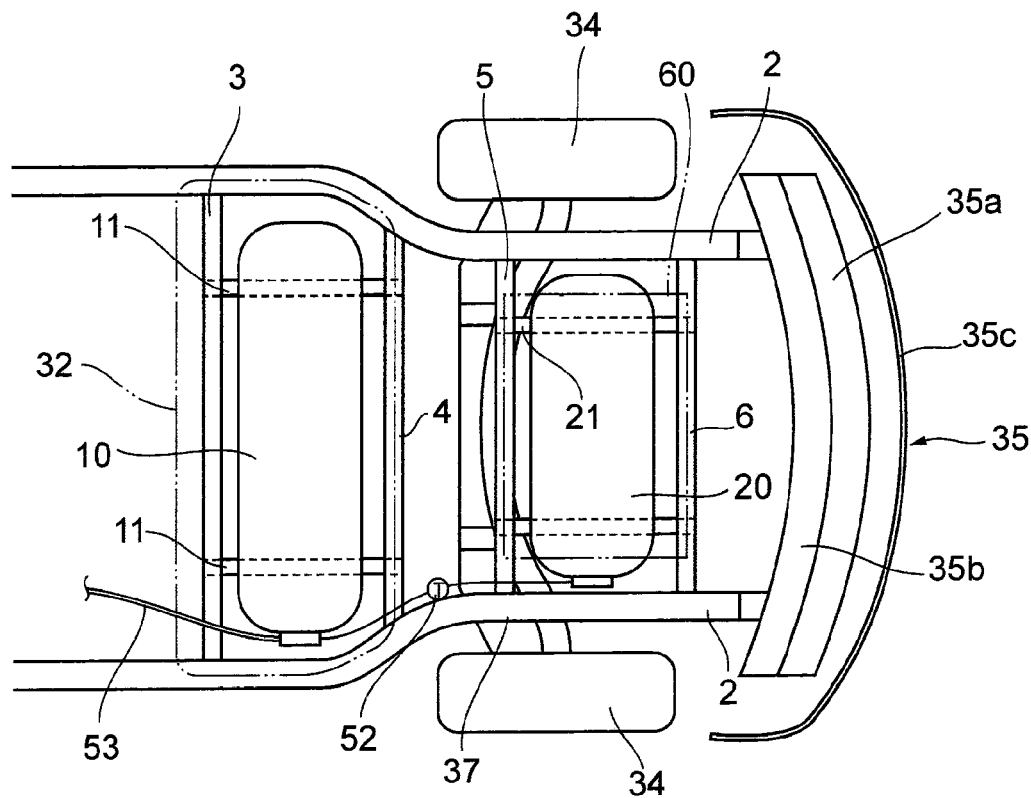
FIG. 10 is a plain view of an area near the rear section of a fuel cell vehicle for illustrating the operation of a front tank, etc. during a rear-end collision.
Figure 11:
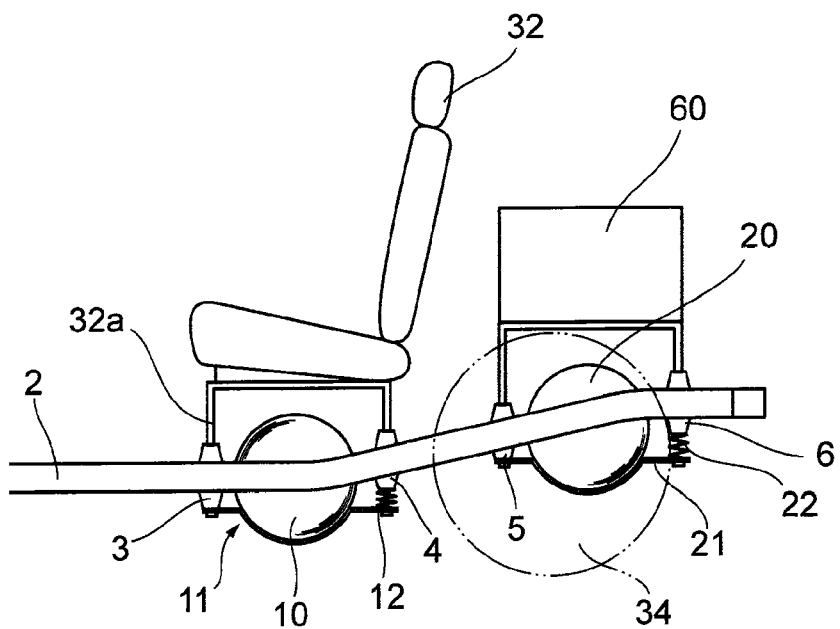
FIG. 11 is a side view of an area near a rear seat during a rear-end collision.

An additional explanation on the matters shown in FIGS. 5A to 5D will be described. FIG. 5A shows a phase immediately prior to a rear-end collision. FIG. 5B shows the first phase in which merely the rear bumper 35 and body are deformed. FIG. 5C shows the second phase in which the rear tank 20 also abuts against the following vehicle (i.e. the cart 70 in FIGS. 5A to 5D) and begins to be displaced. FIG. 5D shows the third phase in which the rear tank 20 collided with the front tank 10. In the third phase, the relative displacement of the rear tank 20 almost stops and the entire fuel cell vehicle 1 begins to move.

Figure 4:
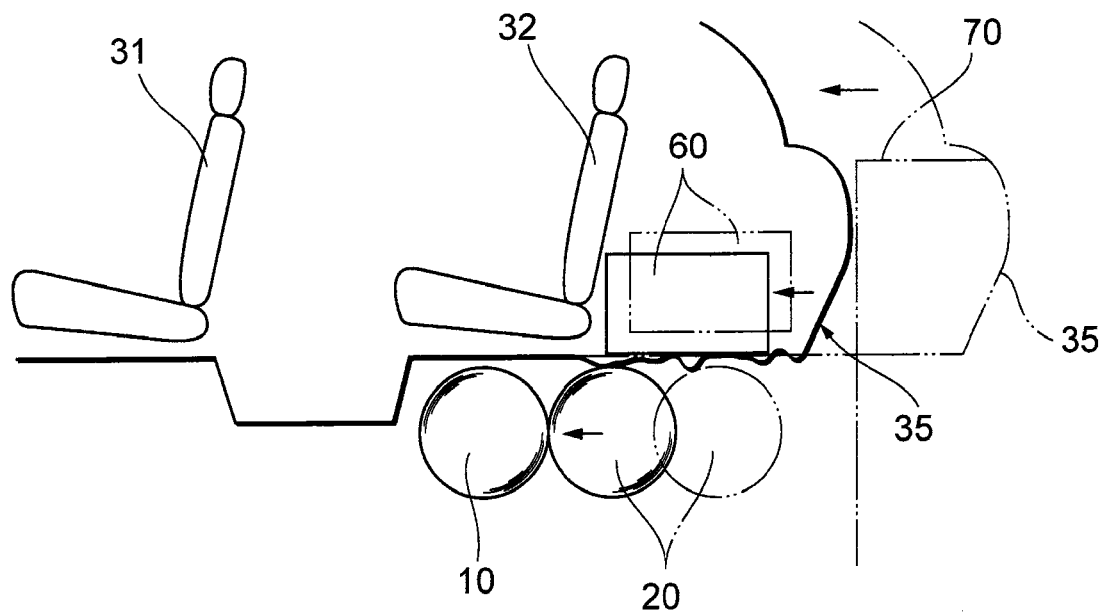
FIG. 4 is a diagram showing the displacement and deformation of a tank, etc. when the vehicle is collided from behind (hereinafter referred to as "rear-end collision").

In addition, in the fuel cell vehicle 1, it is also preferable to fix a secondary battery 60 mounted in the rear luggage 33 to the front and rear cross frames (the third cross frame 5, the rear cross frame 6) to which the tank band 21 for the rear tank 20 is directly or indirectly attached (see FIG. 4). By configuring in such manner, the rear tank 20 and the secondary battery 60 will show an integral relative movement during a collision. As described above, because the front tank 10 has a relatively small relative displacement in the front direction during the rear-end collision of the vehicle, the rear tank 20 bumps into the front tank 10 to thereby stops its movement, even if the rear tank 20 is displaced in the front direction during a rear-end collision. Consequently, the displacement of the secondary battery 60 in the vehicle front direction can be suppressed, and thus it is possible to prevent the secondary battery 60 from causing any damage to a passenger. Incidentally, during a rear-end collision, it is possible, in theory, to ensure a gap which corresponds to a total of the radius of the front tank 10 and the radius of the rear tank 20 between the rear seat 32 and secondary battery 60 (see FIG. 4). In this regard, in order to prevent the secondary battery 60 from colliding into the rear seat 32, it is preferable to configure the gap α between the secondary battery 60 and rear seat 32 to be wider (α>β) than the gap β between the front tank 10 and rear tank 20 (see FIG. 6). By configuring in such manner, it is possible to prevent the case in which the secondary battery 60 collides with the rear seat 32 during a rear-end collision. Note that, the invention is described by illustrating the secondary battery mounted in the rear luggage 33, however, it would be obvious that the present invention can be applied to cases in which devices, other than a battery, for example, high voltage components such as a high voltage auxiliary unit and the like or spare tires are mounted.

When, as the constituent components of the fuel cell system, sensors such as a regulator for pressure-regulating a high-pressure hydrogen gas and a pressure sensor and a hydrogen pipe 53 for supplying hydrogen, etc. are connected to the hydrogen tanks (front tank 10, rear tank 20), it is preferable to take into account the positions of such regulator and the like. For example, in the present embodiment, a sensor 51 and a regulator 52 are disposed on shoulder parts 10d (20d) of the hydrogen tanks (front tank 10, rear tank 20) or in the vicinity thereof (see FIG. 7). In such configuration, even if the rear tank 20 collides with the front tank 10 due to a rear-end collision, it is possible to prevent an external impact from applying to the regulator 52 and the like (see FIGS. 8 and 9). In summary, it is preferable that the regulator 52 and the like are disposed such that they fit in the gap formed when the front tank 10 and the rear tank 20 are in contact with each other. Note that, it is possible to further reduce an external force acting on the regulator 52 and hydrogen pipe 53 during a rear-end collision by using a flexible connection line for the connection line between the regulator 52 and the tanks 10, 20, or by setting the flexibility (see FIGS. 8 and 9) of such connection line beforehand.

Next, the operations of the front tank 10, etc. during a rear-end collision will be described. Hereinafter, such operations will be described using mainly FIGS. 10-13. Note that, in the fuel cell vehicle 1 shown in FIGS. 10-13, a frame 32a of the rear seat 32 is fixed to the first cross frame 3 and the second cross frame 4, and the secondary battery 60 is fixed to the third cross frame 5 and the rear cross frame 6 (see FIG. 11). In addition, the reference symbols 35a, 35b, 35c, and 37 indicate an absorber, a rear bumper reinforcement, a rear bumper cover, and a rear suspension member, respectively.

Figure 12:
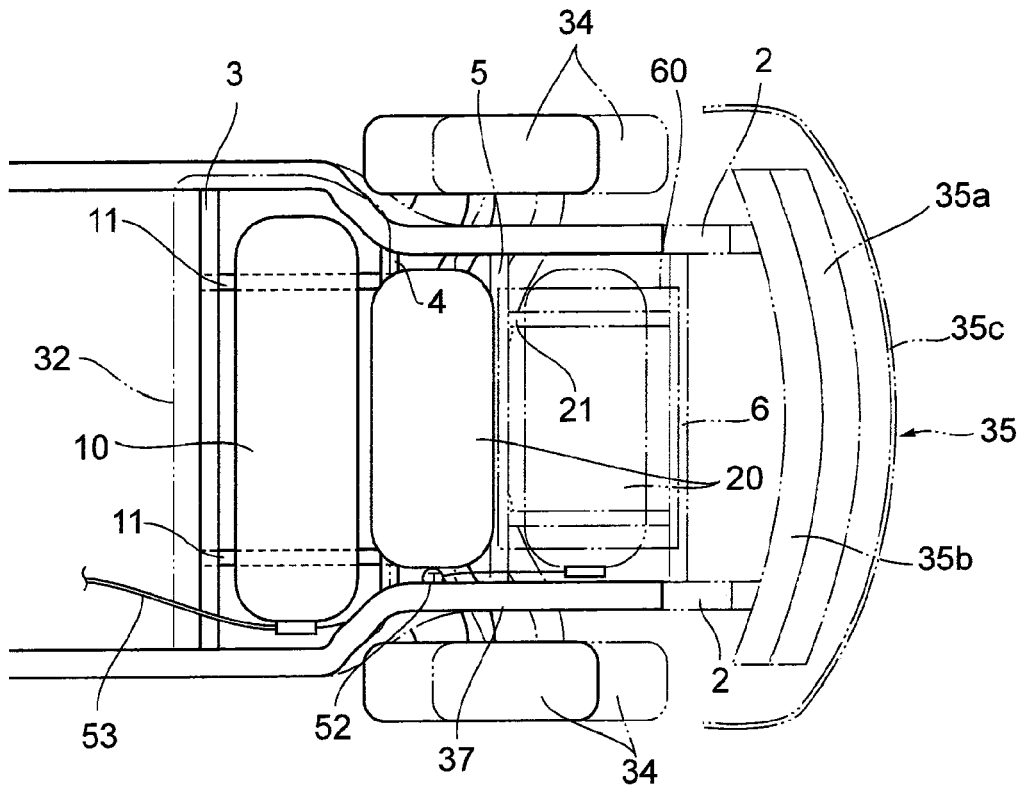
FIG. 12 is a plain view of an area near the rear section of a fuel cell vehicle during a rear-end collision.
Figure 13:
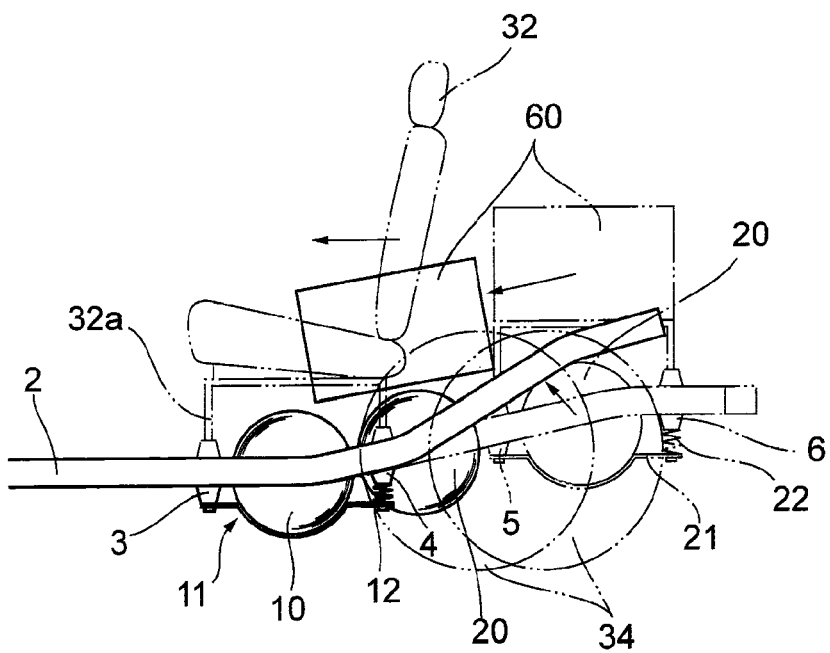
FIG. 13 is a side view of an area near a rear seat during a rear-end collision.

During a rear-end collision, a rear side frame (a rear part of the side frame 2) bends and the rear luggage 33 crushes (see FIG. 12, etc.). When the rear side frame 2 deforms even more, depending on the circumstances, it is in direct contact with a rear-ending object (another vehicle which rear-ended the fuel cell vehicle 1, etc.), and then the rear wheel 34 and rear tank 20 are pushed forward. In such case, since the front tank 10 in the present embodiment has a relatively heavy weight, and thus has a large inertial force (inertial mass), the front tank 10 hardly moves even if the above-described rear tank 20 collides therewith. Therefore, the front tank 10 operates as the so-called bulkhead to suppress further deformations of the constituent components of a vehicle such as the rear tank 20 and eventually the secondary battery 60 which is integrated with the rear tank 20 (see FIGS. 12 and 13, etc.). As a result, it is possible to minimize the deformation of a space, in particular, in the rear seats of the fuel cell vehicle 1, and to thereby minimize any damage which may be caused to a rear-seat passenger.

In the fuel cell vehicle 1 in the present embodiment described above, a supporting structure for a tank responding to a rear-end collision, etc. can be achieved by configuring a structure in which the rear seat 32, the secondary battery 60, etc are integrated with the hydrogen tanks (front tank 10, rear tank 20), which are heavy components, and by using the characteristics of a hydrogen tank (front tank 10) having a small relative displacement due to a large inertial force (inertial mass). In addition, the fuel cell vehicle 1 only has to have a relatively simple structure in which the rear seat 32, etc. is integrated with a hydrogen tank (front tank 10, rear tank 20) to constitute one system, but does not need to be reinforced by other frame structures. In other words, since a supporting structure using a strong outer hull for the weight and pressure resistance of a hydrogen tank is achieved in the present embodiment, no particular heavy weight component or structural object is needed to be added to the original vehicle structure, and thus a weight increase can be suppressed. Therefore, the fuel cell vehicle 1 does not lead to the need of further body reinforcement due to a weight increase and the further weight increase caused thereby in a vicious circle. In addition, according to the fuel cell vehicle 1 of the present embodiment, a structure which sufficiently satisfies the regulations concerning a rear-end collision can be achieved.

Note that, although the embodiment described above is one example of preferred embodiments of the present invention, the present invention is not limited thereto and various modifications may be made without departing from the scope of the present invention. For example, in the above-described embodiment, the case where the rear seat 32 and second battery 60 are integrated with the hydrogen tanks (front tank 10, rear tank 20), respectively is illustrated. However, such secondary battery 60 and the like are merely examples of a displacement suppression target of which relative displacement during the action of an external force to the fuel cell vehicle 1 should be suppressed, and a structure may be configured such that other devices and equipment are integrated with the tanks 10, 20, respectively.

So far, the present invention has been described by illustrating a vehicle of a typical size, such as a passenger vehicle (see FIG. 1, etc.), however, the present invention can be applied to a large-sized vehicle, such as a heavy vehicle or the like.

Figure 14:
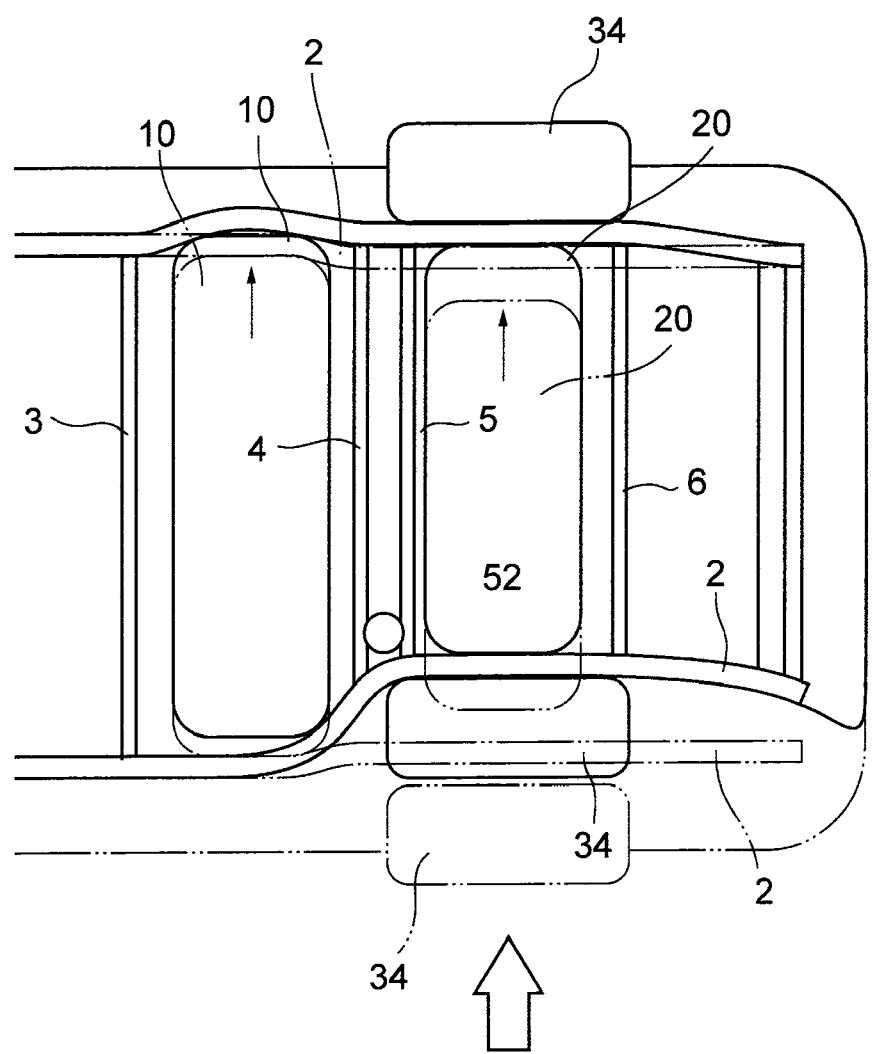
FIG. 14 is a plain view of an area near the rear seat of a fuel cell vehicle for illustrating the displacement and deformation of a tank, etc. during a side collision.

Next, in FIG. 14, another operation when a side collision (a collision from a side direction) occurs in the fuel cell vehicle 1 according to the present invention will be described.

A fuel cell vehicle 1 to be described below has the same structure as the above-described structure. More specifically, for explaining the main parts, such fuel cell vehicle 1 has two hydrogen tanks (front tank 10, rear tank 20) mounted under the floor (the lower part of a vehicle floor) of the vehicle posterior in the cross longitudinal direction, to secure the capacity for hydrogen gas while securing an interior space, etc. The front tank 10 is supported at a position near the lower part of the rear seat 32 in a state of being suspended through the intermediary of tank band 11 and spring 12. Similarly, the rear tank 20 is supported at a position near the lower part of the secondary battery 60 in a state of being suspended through the intermediary of tank band 21 and spring 22. The secondary battery is mounted in the rear luggage 33. The front end of the front tank band 11 is directly attached to the first cross frame 3, and the rear end of the front tank band 11 is attached to the lower end of the spring 12 provided on the second cross frame 4. The front end of the rear tank band 21 is directly attached to the third cross frame 5, and the rear end of the rear tank band 21 is attached to the lower end of the spring 22 provided on the rear cross frame 6 (see FIGS. 1 and 2).

Next, the operation of the front tank 10, etc. during a side collision will be described. During a side collision, the body (in particular, a side thereof) of the fuel cell vehicle 1 deforms by the action of an external force due to the collision. In such case, in the fuel cell vehicle, the front tank 10 and rear tank 20 of the present embodiment have sufficiently large inertial force (inertial mass) compared to other devices or equipment, and therefore do not show a broad movement like other members, etc.

Subsequently, in particular, the collision side body of the fuel cell vehicle 1 deforms further, and the tanks 10, 20 are sandwiched from left and right (both a side which was collided and a side which was not collided) by a side frame 20 and locker which are members of a body framework (see FIG. 14). However, each of the tanks 10, 20 has a strong outer hull structure for securing its pressure resistance, and typically has a resistance higher than an external force acting thereon by being sandwiched from left and right, and thus suppresses a further deformation of the body. In other words, since the front tank 10 and rear tank 20 have sufficiently large rigidity compared to other devices or equipment, they do not highly-deform like the body, etc. Thus, it is possible to minimize the deformation of a space, in particular, in the rear seat of the fuel cell vehicle 1 (see FIG. 14).

As described above, the hydrogen tanks 10, 20 can be used as structural members for suppressing the deformation of the body, the side frame 2, etc. beyond a predetermined amount during a side collision. Therefore, by configuring a structure in such manner, the deformation can be suppressed without adding a reinforcement member for responding to a side collision and without increasing the thickness of each member, allowing unnecessary mass increase to be suppressed. In addition, the rigidity of each of the cross frames 3-6 can be reduced depending on the circumstances.

When disposing a high-voltage unit such as the secondary battery 60 in the rear luggage 33, it is preferable to dispose this secondary battery 60 above the rear tank 20 and to configure the width (a physical size in the traverse direction) of the secondary battery 60 shorter than the entire length of the rear tank 20. By configuring in such manner, a hydrogen tank (in such case, the rear tank 20 in particular) can be utilized as a structural member during a side collision, and thus the effects of an external force on the secondary battery 60, etc. can be minimized.

As in the case of the above-described embodiment, it is preferable to dispose the sensor 51, the regulator 52, the hydrogen pipe 53, etc. on the shoulder parts 10*d* (20*d*) of the hydrogen tanks (front tank 10, rear tank 20) or in the vicinity thereof. When disposing those components in such manner, it is possible to prevent an impact from the outside from applying to the regulator 52, etc. or to reduce such impact, during a side collision (see FIG. 14).

Furthermore, the above-described embodiment illustrates the fuel cell vehicle 1 having a typical configuration where one tank (front tank 10) is disposed approximately underneath the rear seat 32 (see FIG. 1), however, it also is merely one preferable example, and other configurations are obviously possible. However, from the viewpoint of protecting a passenger, it is one of the preferred embodiments to dispose a hydrogen tank (for example, the front tank 10) beneath the rear seat 32 as in the case of the present embodiment.

INDUSTRIAL APPLICABILITY

The present invention is suitable for being applied to a vehicle having a structure for supporting a tank by cross frames, etc.

DESCRIPTION OF REFERENCE SYMBOLS

1: fuel cell vehicle (vehicle), 2: side frame, 3: first cross frame (cross frame), 4: second cross frame (cross frame), 5: third cross frame (cross frame), 6: rear cross frame (cross frame), 10: front tank (a tank disposed on a side of the direction of vehicle travel), 20: rear tank (tank), 32: rear seat (displacement suppression target), 36: vehicle floor, 51: sensor (constituent component of a fuel cell system), 52: regulator (constituent component of a fuel cell system), 53: hydrogen pipe (constituent component of a fuel cell system), 60: secondary battery (displacement suppression target)

What is claimed is:

1. A vehicle comprising:
a plurality of tanks, and
the plurality of tanks each supported by a pair of side frames and a plurality of cross frames which traverse the pair of side frames,
wherein a displacement suppression target on a vehicle floor is supported by the plurality of cross frames of a rear tank of the plurality of tanks, the displacement suppression target having a relative displacement, during an action of an external force on the vehicle, that needs to be suppressed,
wherein a front tank of the plurality of tanks disposed on a side of a forward direction of vehicle travel having a weight heavier than a weight of the rear tank of the plurality of tanks, and
wherein a rear seat of the vehicle is integrated with the front tank, and
the displacement suppression target is integrally attached and moves jointly with the plurality of cross frames of the rear tank of the plurality of tanks in order for the displacement suppression target not to collide with the rear seat.

2. The vehicle according to claim 1, wherein the rear tank is suspended on the plurality of cross frames.

3. The vehicle according to claim 1, wherein the at least one of the plurality of tanks is installed transversely so that the tank fits between the pair of side frames.

4. The vehicle according to claim 1, wherein the vehicle is a fuel cell on which a fuel cell system is mounted.

5. The vehicle according to claim 4, wherein a constituent component of the fuel cell system is disposed at a position off the central lateral axis of the at least one of the plurality of tanks.

6. The vehicle according to claim 1, wherein the plurality of tanks are hydrogen tanks.

\* \* \* \* \*